United States Patent
Berger et al.

(10) Patent No.: US 7,498,092 B2
(45) Date of Patent: Mar. 3, 2009

(54) PERPENDICULAR MAGNETIC RECORDING MEDIUM WITH MAGNETIC TORQUE LAYER COUPLED TO THE PERPENDICULAR RECORDING LAYER

(75) Inventors: Andreas Klaus Berger, San Jose, CA (US); Hoa Van Do, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 470 days.

(21) Appl. No.: 11/044,283

(22) Filed: Jan. 26, 2005

(65) Prior Publication Data

US 2006/0166039 A1 Jul. 27, 2006

(51) Int. Cl.
*G11B 5/66* (2006.01)

(52) U.S. Cl. .................... 428/829; 428/828; 428/828.1; 428/827; 428/829

(58) Field of Classification Search .................. 428/827, 428/828
See application file for complete search history.

(56) References Cited

U.S. PATENT DOCUMENTS

| | | | |
|---|---|---|---|
| 5,851,643 A | 12/1998 | Honda et al. | |
| 6,007,924 A * | 12/1999 | Lal et al. | 428/828.1 |
| 6,168,861 B1 * | 1/2001 | Chen et al. | 428/336 |
| 6,180,268 B1 * | 1/2001 | Tamanoi et al. | 428/818 |
| 6,274,233 B1 | 8/2001 | Yoshikawa et al. | |
| 6,346,339 B1 * | 2/2002 | Harkness et al. | 428/831 |
| 6,348,276 B1 * | 2/2002 | Chen et al. | 428/831 |
| 6,638,597 B1 * | 10/2003 | Shinoda et al. | 428/141 |
| 6,645,647 B1 | 11/2003 | Litvinov et al. | |
| 6,721,238 B2 * | 4/2004 | Tanaka et al. | 369/13.45 |
| 6,743,503 B1 * | 6/2004 | Chen | 428/336 |
| 6,754,020 B1 * | 6/2004 | Hikosaka et al. | 360/59 |
| 6,773,826 B2 * | 8/2004 | Nakagawa et al. | 428/828.1 |
| 6,777,113 B2 * | 8/2004 | Trindade et al. | 428/829 |
| 6,821,652 B1 * | 11/2004 | Okamoto et al. | 428/828.1 |
| 6,828,036 B1 * | 12/2004 | Munteanu et al. | 428/828.1 |
| 6,828,047 B2 * | 12/2004 | Abarra et al. | 428/832.1 |
| 6,844,083 B2 * | 1/2005 | Sugimoto et al. | 428/611 |
| 6,901,034 B2 * | 5/2005 | Nanba | 369/13.03 |
| 6,964,819 B1 * | 11/2005 | Girt et al. | 428/828 |

(Continued)

FOREIGN PATENT DOCUMENTS

EP 1453038 A1 * 9/2004

(Continued)

OTHER PUBLICATIONS

EPO Search Report for the counterpart EPO application.

(Continued)

*Primary Examiner*—D. Lawrence Tarazano
*Assistant Examiner*—Gary D Harris
(74) *Attorney, Agent, or Firm*—Thomas R. Berthold

(57) ABSTRACT

A perpendicular magnetic recording medium, such as a perpendicular magnetic recording disk, has a magnetic "torque" layer (MTL) that exerts a magnetic torque onto the perpendicular magnetic recording layer (RL) in the presence of the applied perpendicular write field. The MTL thus acts as a write assist layer in reversing the magnetization of the RL. A coupling layer (CL) is located between the MTL and the RL and provides the appropriate ferromagnetic coupling strength between the MTL and the RL.

33 Claims, 7 Drawing Sheets

U.S. PATENT DOCUMENTS

| | | | |
|---|---|---|---|
| 7,105,239 B2 * | 9/2006 | Oikawa et al. | 428/828.1 |
| 7,133,330 B2 * | 11/2006 | Nanba | 369/13.03 |
| 7,173,884 B2 * | 2/2007 | Wada et al. | 369/13.42 |
| 7,175,925 B2 * | 2/2007 | Chen et al. | 428/831 |
| 2002/0136930 A1 | 9/2002 | Oikawa et al. | |
| 2003/0017364 A1 | 1/2003 | Kikitsu et al. | |
| 2003/0022023 A1 * | 1/2003 | Carey et al. | 428/694 MM |
| 2003/0099869 A1 | 5/2003 | Oikawa et al. | |
| 2004/0166371 A1 * | 8/2004 | Berger et al. | 428/694 T |
| 2006/0166039 A1 * | 7/2006 | Berger et al. | 428/828.1 |

FOREIGN PATENT DOCUMENTS

| | | |
|---|---|---|
| WO | 2004/097809 A1 | 11/2004 |

OTHER PUBLICATIONS

Ando, et al., "Effects of In-Plane Hard Magnetic Layer on Demagnetization and Media Noise in Triple-Layered Perpendicular Recording Media", IEICE Trans Electron., vol. E78-C, No. 11, Nov. 1995.

Benakli et al., "Micromachined Study of Switching Speed in Perpendicular Recording Media", IEEE Trans on Magnetics, vol. 37, No. 4, Jul. 2001, pp. 1564-1566.

Gao et al., "Transition Jitter Estimates in Tilted and Conventional Perpendicular Recording Media at 1 Tb/in2", IEEE Trans on Magnetics, vol. 39, No. 2, Mar. 2003, pp. 704-709.

* cited by examiner

PERPENDICULAR MAGNETIC RECORDING MEDIUM WITH MAGNETIC TORQUE LAYER COUPLED TO THE PERPENDICULAR RECORDING LAYER

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The most common type of perpendicular magnetic recording system is one that uses a "probe" or single pole recording head with a "dual-layer" media as the recording disk. The dual-layer media comprises a perpendicular magnetic data recording layer (RL) formed on a "soft" or relatively low-coercivity magnetically permeable underlayer (SUL), with the SUL serving as a flux return path for the field from the pole recording head. This type of system is also called "Type 1" perpendicular magnetic recording. A schematic of such a prior art system with a read element for reading the recorded data is shown in FIG. 1.

FIG. 2 is a schematic of a cross-section of a prior art perpendicular magnetic recording disk showing the write field H acting on the recording layer RL. The disk also includes the hard disk substrate, a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic mirror image of the RWH during the write process. This effectively brings the RL into the gap of the ARH and allows for a large write field H inside the RL. However, this geometry also results in the write field H inside the RL being oriented nearly parallel to the surface normal, i.e., along the perpendicular easy axis of the RL grains, as shown by typical grain 10 with easy axis 12. The parallel alignment of the write field H and the RL easy axis has the disadvantage that relatively high write fields are necessary to reverse the magnetization because no torque is exerted onto the grain magnetization. Also, a write-field/easy-axis alignment increases the magnetization reversal time of the RL grains (M. Benakli et al., *IEEE Trans. MAG* 37, 1564(2001)). For these reasons, "tilted" media have been theoretically proposed, in which the magnetic easy axis of the RL is tilted at an angle of about 45 degrees with respect to the surface normal, so that magnetization reversal can be accomplished with a lower write field and without an increase in the reversal time. (K.-Z. Gao and H. N. Bertram, *IEEE Trans. MAG* 39, 704(2003)). However, there is no known fabrication process to make high-quality recording media with a tilted easy axis.

What is needed is a perpendicular magnetic recording media that displays a magnetization reversal behavior similar to tilted media and is fully compatible with conventional fabrication processes.

SUMMARY OF THE INVENTION

The invention is a perpendicular magnetic recording medium, such as a perpendicular magnetic recording disk, with a magnetic "torque" layer (MTL) that exerts a magnetic torque onto the perpendicular magnetic recording layer (RL) in the presence of the applied perpendicular write field. The MTL thus acts as a write assist layer in reversing the magnetization of the RL. A coupling layer (CL) is located between the MTL and the RL and provides the appropriate ferromagnetic coupling strength between the MTL and the RL. The MTL has a substantial in-plane magnetization component and an easy axis of magnetization that is non-collinear with the RL easy axis of magnetization. In one embodiment the MTL is located between the soft magnetic underlayer (SUL) of the disk and the RL, and the CL is located between the MTL and the RL. In this embodiment the MTL and CL are formed of materials that enable the growth of a high performance RL on top of the MTL/CL structure. In a second embodiment the CL is located on top of the RL and the MTL is located on top of the CL.

While the primary purpose of the MTL is the application of torque during the write process, which aids the overall write process, the MTL may also exhibit a magnetization pattern that adds to the overall media signal, even in the absence of an externally applied field.

For a fuller understanding of the nature and advantages of the present invention, reference should be made to the following detailed description taken together with the accompanying figures.

DETAILED DESCRIPTION OF THE INVENTION

Figure 1:
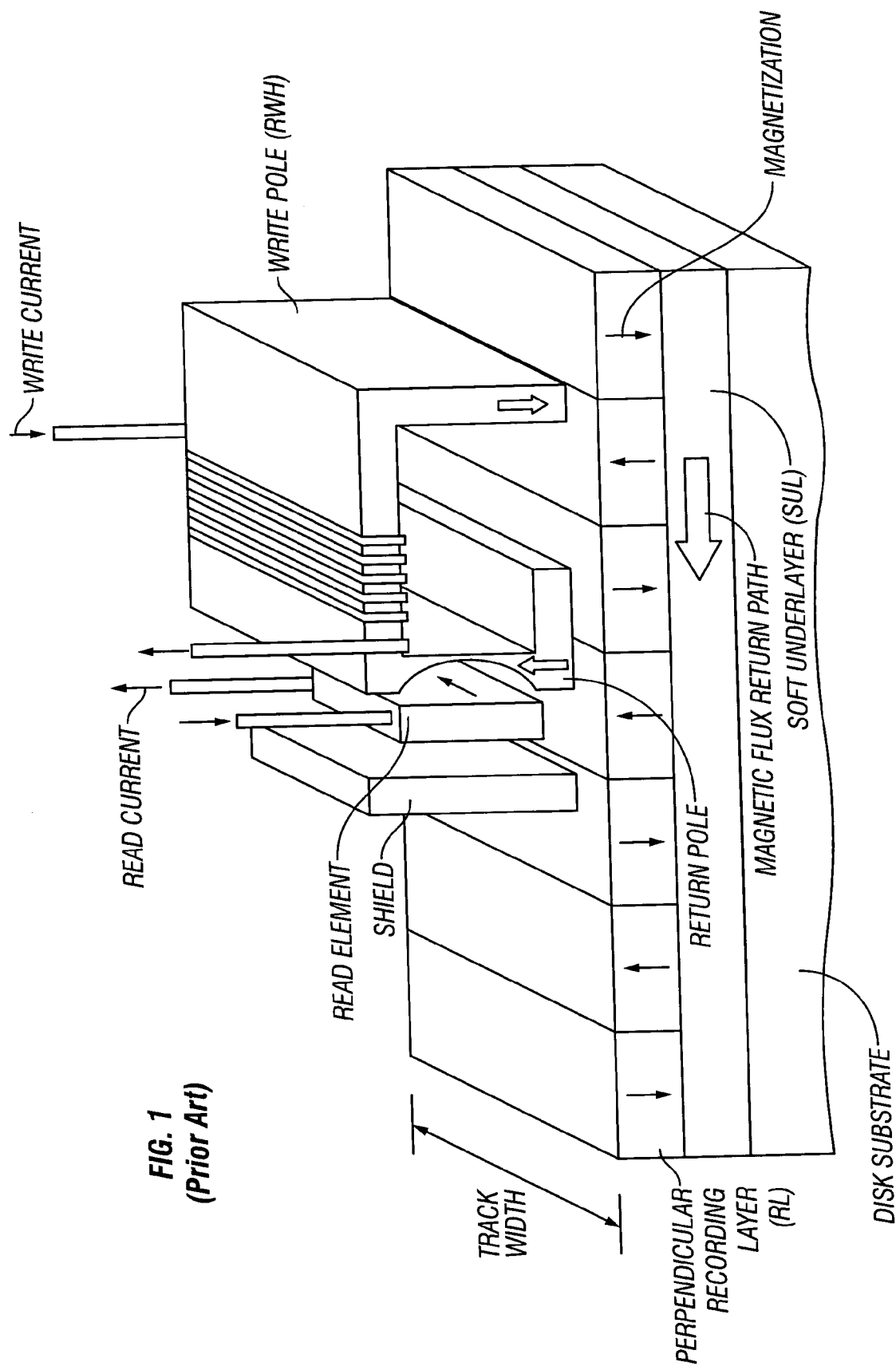
FIG. 1 is a schematic of a prior art perpendicular magnetic recording system.
Figure 2:
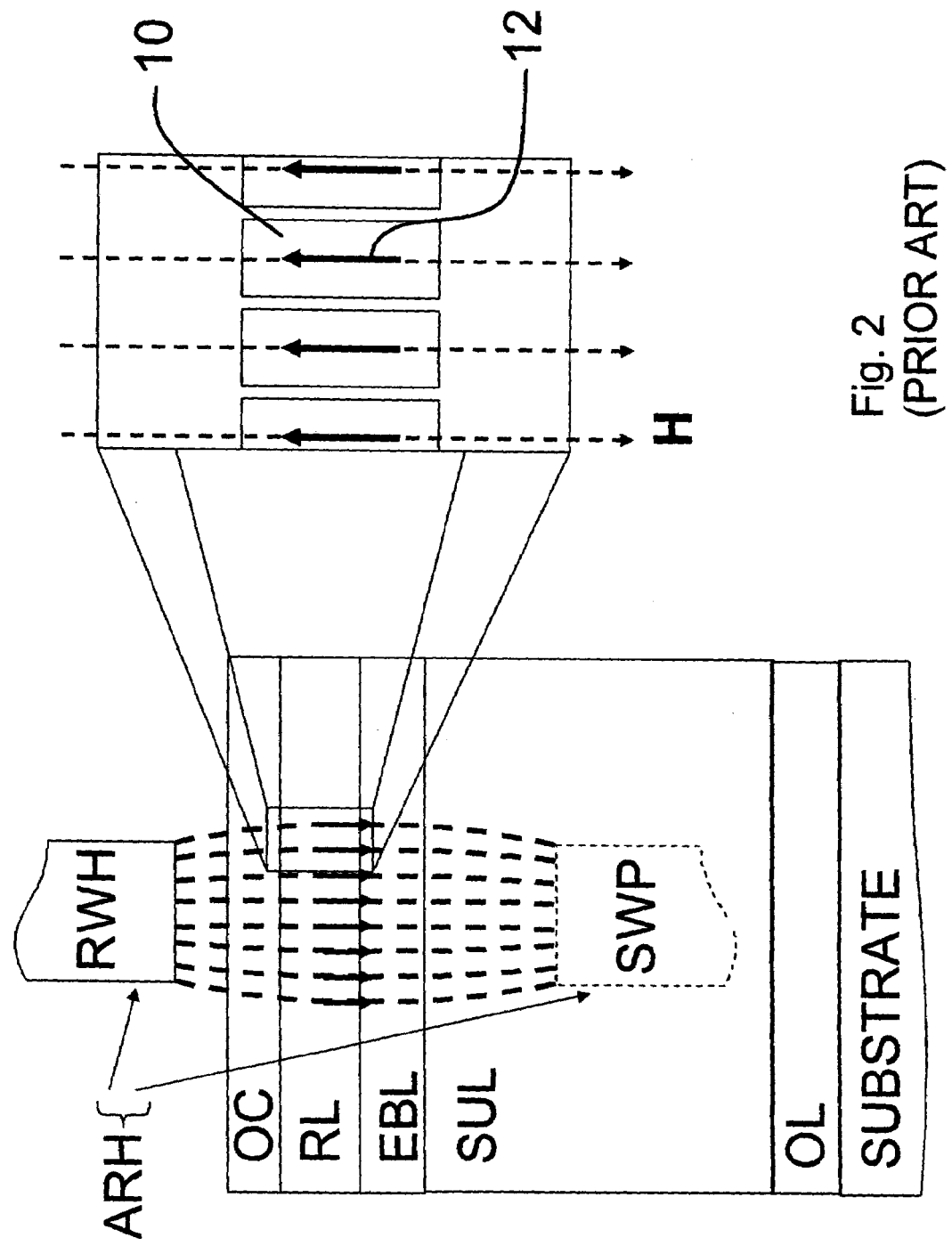
FIG. 2 is a schematic of a cross-section of a prior art perpendicular magnetic recording disk showing the write field H acting on the recording layer (RL).
Figure 3:
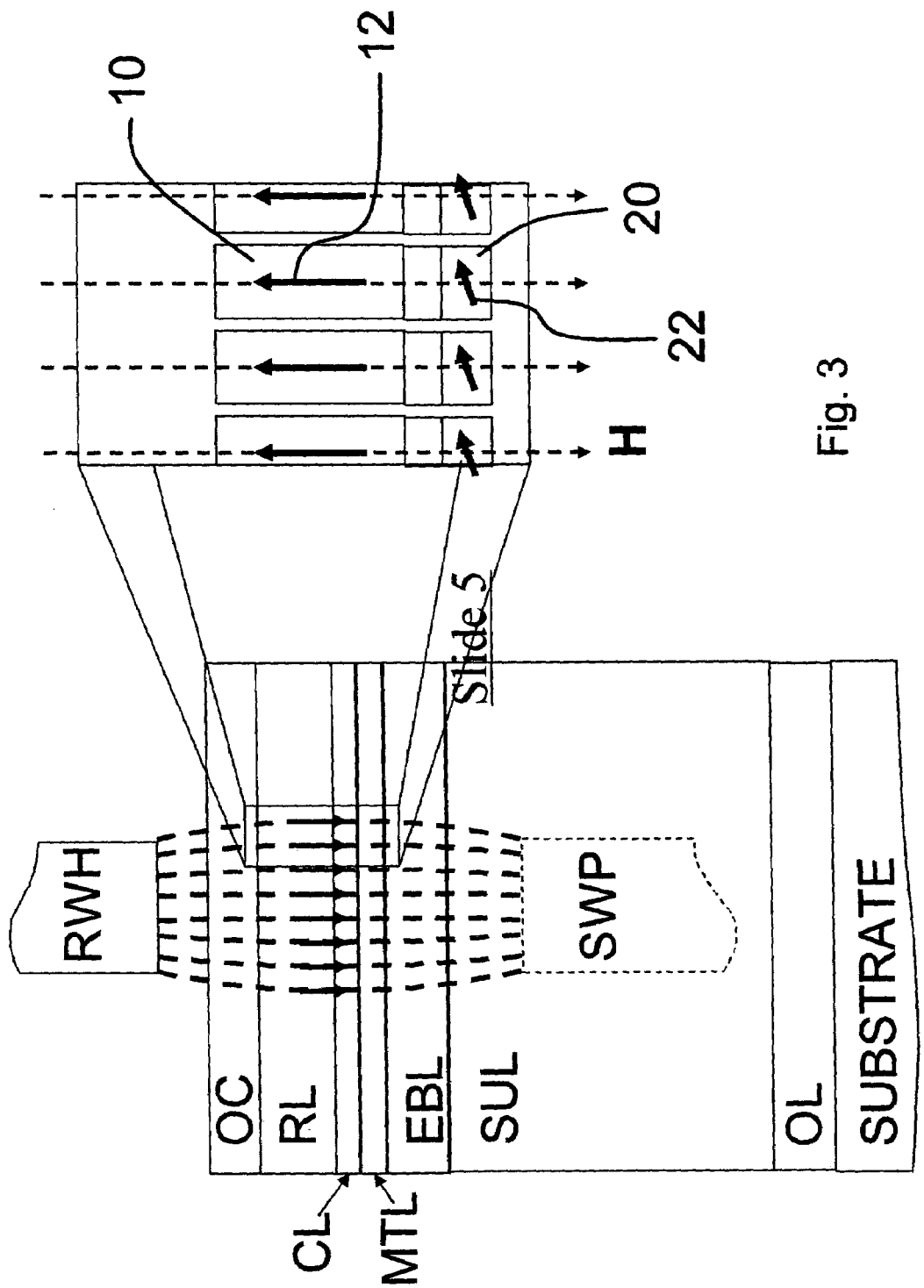
FIG. 3 is a schematic of a cross-section of the perpendicular magnetic recording disk according to a first embodiment of the present invention showing the write field H acting on the recording layer (RL) and the magnetic torque layer (MTL) coupled to it by a ferromagnetic coupling layer (CL), with the CL and MTL being located below the RL.

The invention is a perpendicular magnetic recording medium with a thin magnetic "torque" layer (MTL) that has a substantial in-plane magnetization component and an easy axis of magnetization that is non-collinear with the RL easy axis of magnetization, and a ferromagnetic coupling layer (CL) between the MTL and RL that provides the appropriate ferromagnetic coupling strength between MTL and RL. A MTL with an in-plane easy axis of magnetization is one particular implementation of the invention. The medium in the form of a disk is shown in sectional view in FIG. 3 with the write field H. In the embodiment of FIG. 3, the CL and MTL are located below the RL. As shown in the exploded portion of FIG. 3, a typical grain 10 in the RL has a perpendicular or out-of-plane magnetization along easy axis 12, and a typical grain 20 in the MTL directly below RL grain 10 has a substantially horizontal or in-plane magnetization along easy axis 22. The magnetization of the MTL does not need to be entirely in-plane but should have a substantial in-plane component, such as would be provided if the magnetization of the MTL is less than about 45 degrees out-of-plane. In the presence of the applied perpendicular write field H, the MTL acts as a write assist layer by exerting a magnetic torque onto the RL that assists in reversing the magnetization of the RL. While the primary purpose of the MTL is the application of torque during the write process, which aids the overall write process, the MTL may also exhibit a magnetization pattern that adds to the overall media signal, even in the absence of an externally applied field.

Figure 4:
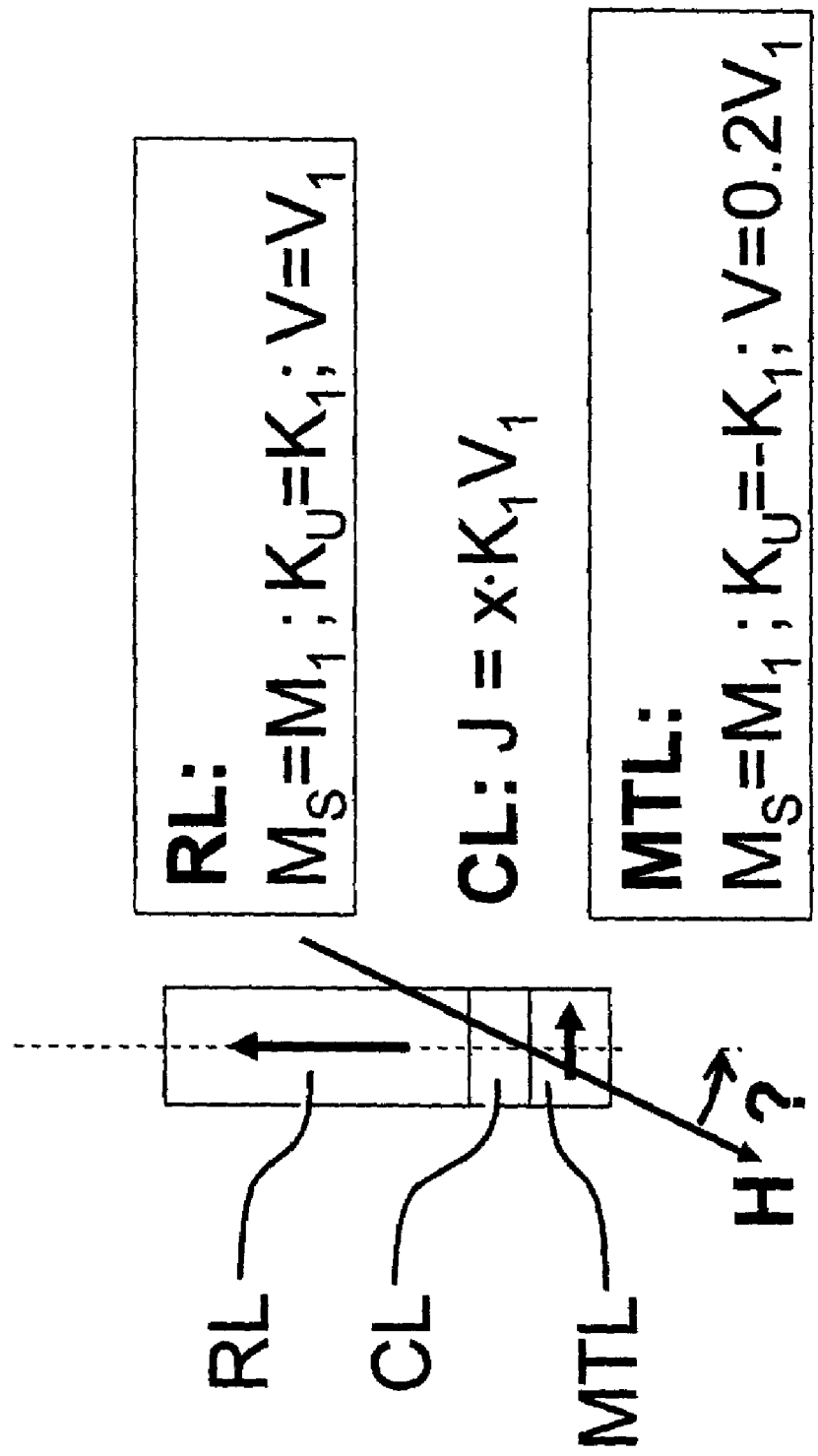
FIG. 4 is a schematic of a magnetic model of the magnetic grains of the recording layer (RL) and magnetic torque layer (MTL) of the present invention with their respective easy axes of magnetization.

The advantage of the medium of this invention has been estimated by magnetic modeling calculations. In the model, schematically displayed in FIG. 4, the MTL-RL grain is modeled as two coupled Stoner-Wohlfarth particles, each having uniaxial magnetic anisotropy but oriented orthogonal to one another. Uniaxial magnetic anisotropy of a ferromagnetic layer with an anisotropy constant K means essentially that all of the magnetic moments tend to align along the same axis, referred to as the easy axis, which is the lowest energy state. The anisotropy field $H_K$ of a ferromagnetic layer with uniaxial magnetic anisotropy K is the magnetic field that would need to be applied along the easy axis to switch the magnetization direction.

In the example that was modeled, the RL grain was characterized by magnetization $M_1$, anisotropy constant $K_1$ and volume $V_1$, while the MTL grain was characterized by magnetization $M_1$, anisotropy constant $-K_1$ and volume $0.2 V_1$. The opposite signs for the anisotropy constants represent the orthogonal magnetic anisotropy. The MTL was assumed to be a factor of 5 thinner than the RL to achieve a realistic geometry for the medium structure. For a thicker MTL, a larger torque and write assist effect would be expected, but other recording properties might degrade if the MTL is too thick. The MTL and RL were coupled across the CL by a ferromagnetic coupling of strength J, whose size is given in fractions of the anisotropy energy of the RL grain, i.e., $J = x \cdot K_1 \cdot V_1$. In the modeled calculation, this coupled grain system was exposed to a static magnetic field H applied at an angle θ with the grain axis, and the magnetic switching field $H_S$ was calculated.

Figure 5:
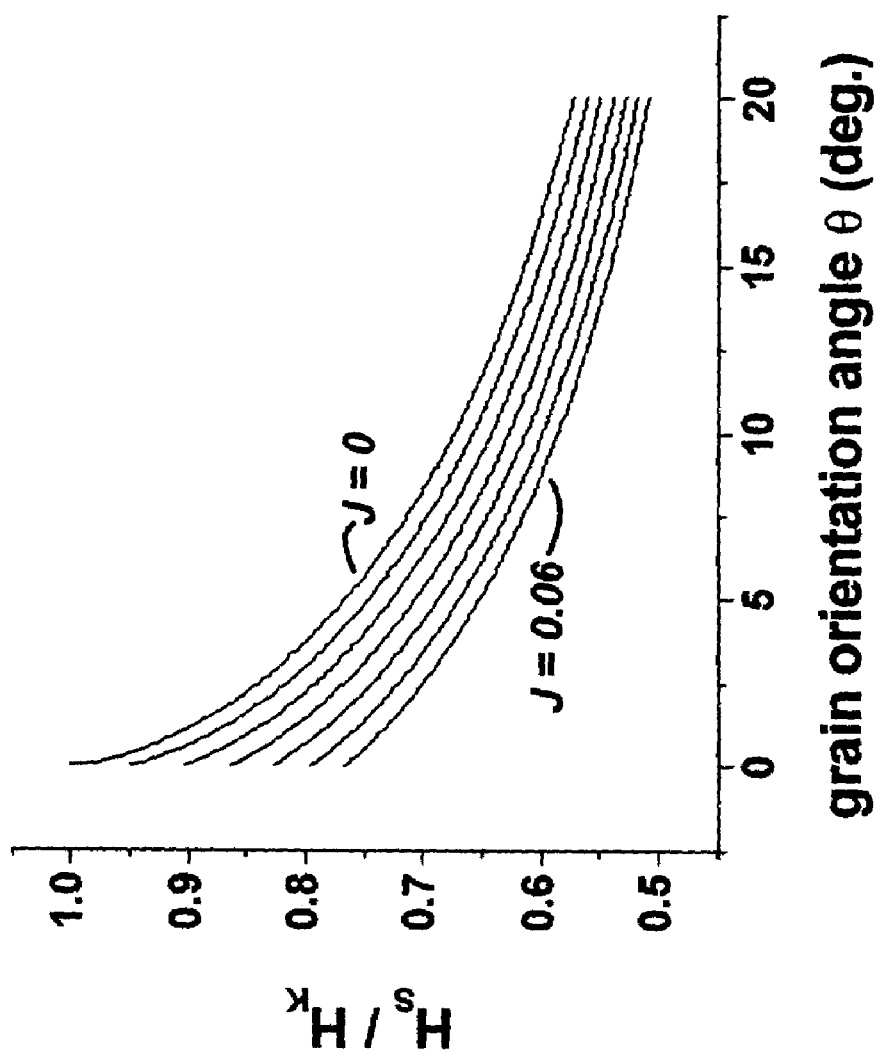
FIG. 5 is a graph of calculated switching field $H_S$ in units of $H_K$ as a function of the grain orientation angle $\theta$ for various values of the coupling strength J.

FIG. 5 shows the calculated switching field $H_S$ in units of $H_K$ ($= 2 \cdot K_1 / M_1$) as a function of the grain orientation angle θ for various values of the coupling strength J. The seven curves represent the coupling values J=0 to 0.06 in steps of 0.01. Model calculations for J=0 are equivalent to the case of a RL without an MTL. As can be seen from FIG. 5, coupling of the RL to the MTL lowers the switching field $H_S$, in particular for well-oriented grains near θ=0. For example, with J=0.06, at θ=0 the switching field $H_S$ is only approximately 75% of $H_K$, which would be the switching field required without the MTL.

Figure 6:
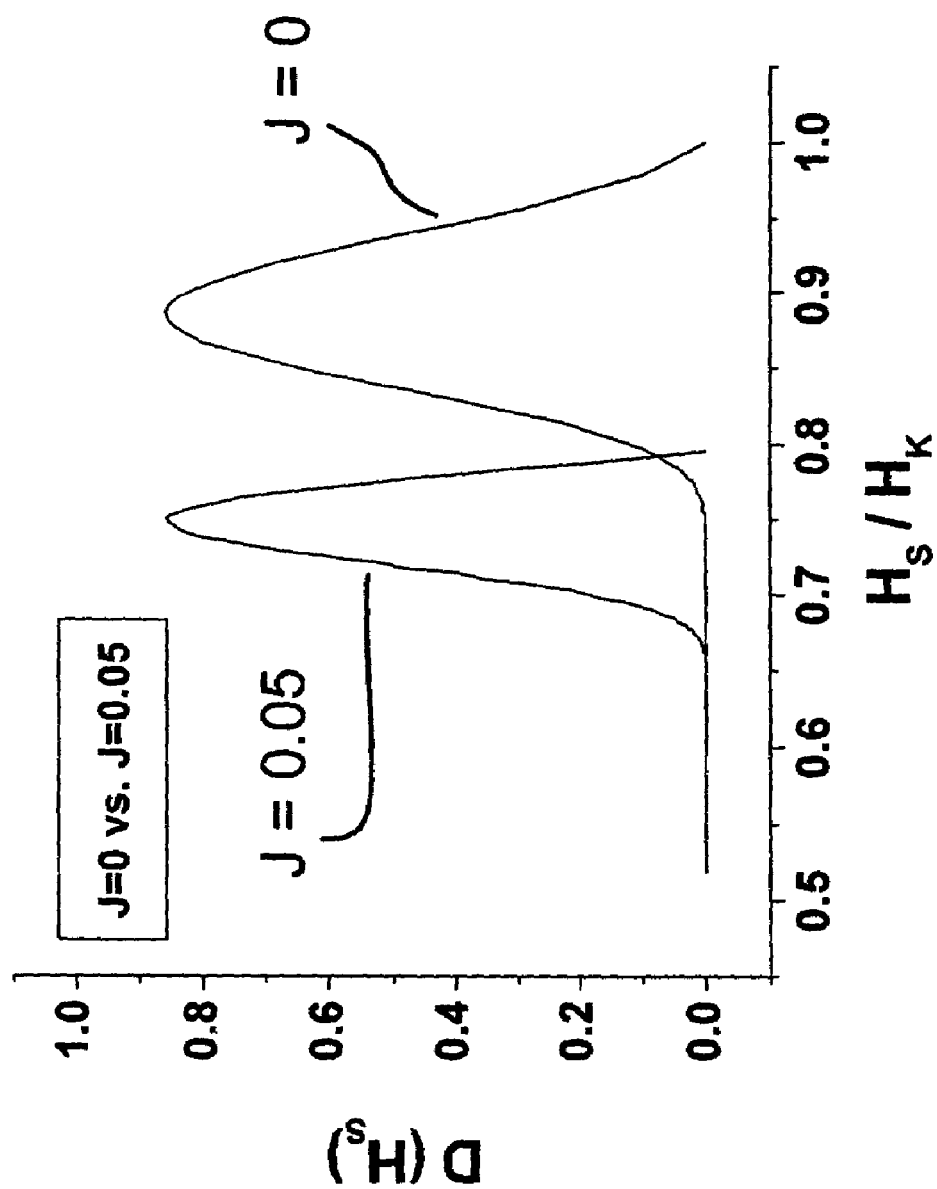
FIG. 6 shows the distribution of switching field $H_S$ values for a Gaussian distribution of grain orientation angles $\theta$, centered around $\theta=0$ with a full-width-half-maximum (FWHM) of 3.3 degrees, for the disk structure of the invention with an MTL coupled to the RL (J=0.05) and for the prior art disk structure without an MTL (J=0).

Because it is not possible to manufacture a disk in which the grain orientation θ is a constant value at all locations on the disk, it is important to also model the invention for a distribution of θ values. FIG. 6 shows as an example the distribution in values of switching field $H_S$ for a Gaussian distribution of θ, centered around θ=0 with a FWHM of 3.3 degrees, for the disk structure of the invention with an MTL coupled to the RL (J=0.05) and for the prior art disk structure without an MTL (J=0). It is evident that coupling to the MTL significantly lowers both the mean switching field $<H_S>$ and the switching field distribution width $\Delta H_S$. Thus, MTL-type media are expected to not only show improved writability but also lower intrinsic media noise, since it is known that a large switching field distribution is a significant contributor to media jitter. The modeling has also shown that for the same distribution of θ (e.g., for θ centered around 0 with a FWHM of 3.3 degrees, as for FIG. 6), both the mean switching field $<H_S>$ and the relative switching field distribution width $\Delta H_S / <H_S>$ are decreased as J is increased. Substantial improvement of up to a 20% reduction in $<H_S>$ and 45% in $\Delta H_S / <H_S>$ were observed. The modeling has also established that the improvements are larger for media with better grain orientation, i.e., MTL-type structures are expected to be especially effective for the highest quality RL.

The calculated improvements are due to reduced activation barriers of recording media at high applied write fields, which are achieved by the torque of the MTL coupled to the RL. However, the calculations did not consider the true dynamic torques occurring in such geometry and their effect on switching speed. Those effects may be even larger than the calculated effects, which would correspond to an even larger improvement potential for MTL-type media.

A representative disk structure for the invention shown in FIG. 3 will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 2-5 nm. The SUL may be formed of magnetically permeable materials such as alloys of CoNiFe, FeCoB, CoCuFe, NiFe, FeAlSi, FeTaN, FeN, FeTaC, CoTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a 5 nm nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 2-4 nm thick NiFe seed layer may be deposited on top of the SUL, followed by a 5-20 nm thick Ru EBL.

The RL can be any of the known amorphous or crystalline materials and structures that exhibit perpendicular magnetic anisotropy. Thus, the RL may be a layer of granular polycrystalline cobalt alloy, such as a CoPt or CoPtCr alloy, with or without an oxide, such as oxides of Si, Ta, Ti, or B. Also, the RL may be composed of multilayers with perpendicular magnetic anisotropy, such as Co/Pt, Co/Pd, Fe/Pt and Fe/Pd multilayers. In addition, perpendicular magnetic layers containing rare earth elements are useable for the RL, such as CoSm, TbFe, TbFeCo, GdFe alloys. The RL has a typical thickness of 10-25 nm. The OC formed on top of the RL may be an amorphous "diamond-like" carbon film or other known protective overcoats, such as Si-nitride.

In the embodiment of FIG. 3, in which the MTL and CL are below the RL, the MTL should be formed of a material that enables the growth of a high performance RL on top of the MTL/CL structure. For instance, the MTL could be a hexagonal-close-packed (hcp) material with a basal plane magnetic easy axis. The c-axis of the MTL is perpendicular or out-of-plane to encourage coherent epitaxial growth of the CL and RL with their c-axes also perpendicular. This material should be compatible with the EBL material on which it grows and provide a good template for the CL and the RL. The magnetic easy axis of the MTL in the basal plane does not have to be due to the magnetocrystalline anisotropy of the MTL material alone, because the MTL is exposed to a considerable magnetostatic effect. Thus, the MTL will exhibit a remanent magnetic state with a magnetization substantially in-plane (i.e., less than 45 degrees out-of-plane) as long as the magnetostatic effect is larger than the magnetocrystalline anisotropy K, i.e., $2\pi \cdot M_S^2 > K$, because the effective anisotropy $K_{\mathit{eff}}$ is the difference of both contributions $K_{\mathit{eff}} = K - (2\pi \cdot M_S^2)$. A positive K value refers herein to a material with a magnetocrystalline easy axis along the out-of-plane c-axis. Thus, materials suitable for the MTL are Co, CoCr, CoCrB, CoRu, CoRuCr, CoRuCrB, CoTa, and CoPtCrB with low Pt content (less than about 12 atomic percent). Si-oxide or other oxides like oxides of Ta, Ti, and B may be added to these alloys in an amount up to about 15 atomic percent. The MTL is a relatively soft ferromagnetic material with coercivity less than approximately 2000 Oe. The MTL has a thickness of between about 1-10 nm, preferably between about 1-5 nm.

In the embodiment of FIG. 3, in which the MTL and CL are below the RL, the CL also has to sustain the growth of the RL, while mediating a weak ferromagnetic coupling between the MTL and the RL. Thus, hcp materials for instance, which can mediate a weak ferromagnetic coupling, grow well on the potential MTL materials, and provide a good template for the RL, are good candidates. Thus the CL may be formed of RuCo and RuCoCr alloys with low Co content (<about 40 atomic percent), or CoCr and CoCrB alloys with high Cr and/or B content (Cr+B>about 30 atomic percent). Si-oxide or other oxides like oxides of Ta, Ti and B may be added to these alloys in an amount up to about 15 atomic percent. The CL has a thickness of between about 0.5-10 nm, preferably between about 0.5-3 nm. The CL must enable an appropriate coupling strength. Therefore, it needs to be either nonmagnetic or weakly ferromagnetic. An appropriate coupling strength J, has to have a considerable effect on the switching field (and the switching field distribution), but has to be small enough so that it does not couple the two layers rigidly together. Thus, an upper estimate for the useful J range is $K_1 * V_1$, with a preferred implementation of J=0.03-0.4.

Figure 7:
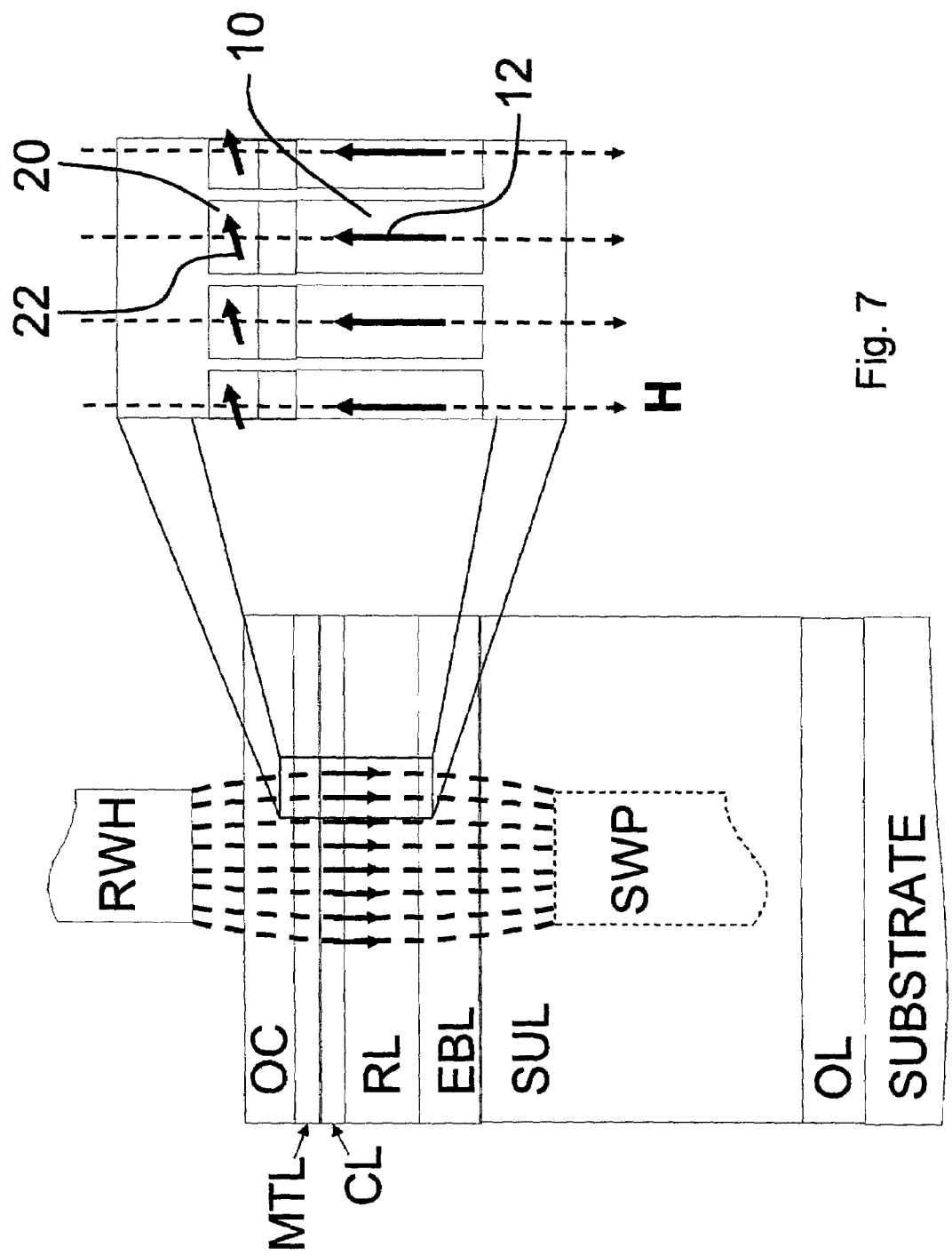
FIG. 7 is a schematic of a cross-section of the perpendicular magnetic recording disk according to a second embodiment of the present invention showing the write field H acting on the recording layer (RL) and the magnetic torque layer (MTL) coupled to it by a ferromagnetic coupling layer (CL), with the CL and MTL being located above the RL.

FIG. 7 shows a second embodiment of the invention in which the CL and MTL are located above the RL. The CL and MTL function in the same manner as described above. The embodiment of FIG. 3 provides the advantage of locating the RL closer to the disk surface and thus closer to the read/write head. However, if the CL and MTL are located above the RL, as in FIG. 7, then there is less of a requirement that the CL and MTL provide a good template for the growth of the RL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium for use in a system with a perpendicular recording write pole, the medium comprising:
   a substrate;
   an underlayer of magnetically permeable material on the substrate as a return path for magnetic flux from the write pole;
   an exchange break layer on the underlayer;
   a ferromagnetic write assist layer having an easy axis of magnetization and a magnetization less than about 45 degrees out-of-plane;
   a ferromagnetic recording layer having perpendicular magnetic anisotropy and an out-of-plane easy axis of magnetization substantially perpendicular to the plane of the recording layer and non-collinear with the easy axis of magnetization of the write assist layer;
   a nonmagnetic coupling layer between the write assist layer and the recording layer and having a thickness between about 5 Å and 30 Å, the coupling layer being in direct contact with the write assist layer and the recording layer and permitting ferromagnetic coupling of the write assist layer with the recording layer, wherein the write assist layer, coupling layer and recording layer are located on the exchange break layer; and
   wherein the exchange break layer between the underlayer and the recording layer prevents magnetic exchange coupling between the underlayer and the recording layer.

2. The medium of claim 1 wherein the write assist layer is a hexagonal-close-packed material with its c-axis oriented substantially perpendicular to the write assist layer and the coupling layer is a hexagonal-close-packed material with its c-axis oriented substantially perpendicular to the coupling layer.

3. The medium of claim 1 wherein the write assist layer is a magnetically permeable material with coercivity less than about 2000 Oe.

4. The medium of claim 1 wherein the write assist layer is formed of a material selected from the group consisting of (a) an alloy comprising Co and one or more of Cr, B, Ru, and Ta, and (b) an alloy comprising Co, Pt, Cr and B with Pt content less than about 12 atomic percent.

5. The medium of claim 4 wherein the write assist layer further comprises one or more oxides of Si, Ta, Ti and B.

6. The medium of claim 1 wherein the coupling layer is formed of a material selected from the group consisting of (a) a RuCo alloy with Co less than about 40 atomic percent, (b) a RuCoCr alloy with Co less than about 40 atomic percent, and (c) an alloy of Co and one or more of Cr and B with the combined content of Cr and B greater than about 30 atomic percent.

7. The medium of claim 6 wherein the coupling layer further comprises one or more oxides of Si, Ta, Ti and B.

8. The medium of claim 1 wherein the write assist layer is on the exchange break layer, the coupling layer is on the write assist layer and the recording layer is on the coupling layer.

9. The medium of claim 1 wherein the coupling layer is on the recording layer and the write assist layer is on the coupling layer.

10. The medium of claim 1 wherein the exchange break layer consists essentially of Ru and further comprising a seed layer consisting essentially of NiFe between the underlayer and the Ru exchange break layer.

11. The medium of claim 1 wherein the exchange break layer consists essentially of titanium.

12. The medium of claim 1 wherein the exchange break layer is formed of material selected from the group consisting of Si, Ge, SiGe alloys, Cr, Ru, W, Zr, Nb, Mo, V, Al, CrTi, NiP, $CN_x$, $CH_x$, C, and oxides, nitrides and carbides of an element selected from the group consisting of Si, Al, Zr, Ti, and B.

13. The medium of claim 1 wherein the recording layer is a granular polycrystalline cobalt alloy.

14. The medium of claim 13 wherein the recording layer further comprises an oxide of one or more of Si, Ta, Ti and B.

15. The medium of claim 1 wherein the recording layer is a multilayer selected from the group consisting of Co/Pt, Co/Pd, Fe/Pt and Fe/Pd multilayers.

16. The medium of claim 1 wherein the underlayer is formed of a material selected from the group consisting of alloys of CoFe, CoNiFe, NiFe, FeCoB, CoCuFe, FeAlSi, FeTaN, FeN, FeTaC, CoTaZr and CoZrNb.

17. The medium of claim 1 wherein the underlayer is a lamination of multiple magnetically permeable films separated by nonmagnetic films.

18. The medium of claim 17 wherein the nonmagnetic films in the lamination provide antiferromagnetic coupling of the magnetically permeable films in the lamination.

19. A perpendicular magnetic recording disk for use in a disk drive with a perpendicular recording write pole, the disk comprising:
    a substrate;
    an underlayer of magnetically permeable material on the substrate as a return path for magnetic flux from the write pole;
    an exchange break layer on the underlayer;
    a ferromagnetic write assist layer on the exchange break layer and having an easy axis of magnetization and a magnetization less than about 45 degrees out-of-plane;
    a ferromagnetic recording layer having perpendicular magnetic anisotropy and an out-of-plane easy axis of magnetization substantially perpendicular to the plane of the recording layer and non-collinear with the easy axis of magnetization of the write assist layer, the exchange break layer preventing magnetic exchange coupling between the underlayer and the recording layer; and
    a coupling layer between the write assist layer and the recording layer and having a thickness between about 5 Å and 30 Å, the coupling layer being in direct contact with the write assist layer and the recording layer and permitting ferromagnetic coupling of the write assist layer with the recording layer, the coupling layer being formed of a material selected from the group consisting of (a) a RuCo alloy with Co less than about 40 atomic percent, (b) a RuCoCr alloy with Co less than about 40 atomic percent, and (c) an alloy of Co and one or more of Cr and B with the combined content of Cr and B greater than about 30 atomic percent.

20. The disk of claim 19 wherein the write assist layer is a hexagonal-close-packed material with its c-axis oriented substantially perpendicular to the write assist layer and the coupling layer is a hexagonal-close-packed material with its c-axis oriented substantially perpendicular to the coupling layer.

21. The disk of claim 19 wherein the write assist layer is a magnetically permeable material with coercivity less than about 2000 Oe.

22. The disk of claim 19 wherein the write assist layer is formed of a material selected from the group consisting of (a) an alloy comprising Co and one or more of Cr, B, Ru, and Ta, and (b) an alloy comprising Co, Pt, Cr and B with Pt content less than about 12 atomic percent.

23. The disk of claim 22 wherein the write assist layer further comprises one or more oxides of Si, Ta, Ti and B.

24. The disk of claim 19 wherein the coupling layer further comprises one or more oxides of Si, Ta, Ti and B.

25. The disk of claim 19 wherein the exchange break layer consists essentially of Ru and further comprising a seed layer consisting essentially of NiFe between the underlayer and the Ru exchange break layer.

26. The disk of claim 19 wherein the exchange break layer consists essentially of titanium.

27. The disk of claim 19 wherein the exchange break layer is formed of material selected from the group consisting of Si, Ge, SiGe alloys, Cr, Ru, W, Zr, Nb, Mo, V, Al, CrTi, NiP, $CN_x$, $CH_x$, C, and oxides, nitrides and carbides of an element selected from the group consisting of Si, Al, Zr, Ti, and B.

28. The disk of claim 19 wherein the recording layer is a granular polycrystalline cobalt alloy.

29. The disk of claim 28 wherein the recording layer further comprises an oxide of one or more of Si, Ta, Ti and B.

30. The disk of claim 19 wherein the recording layer is a multilayer selected from the group consisting of Co/Pt, Co/Pd, Fe/Pt and Fe/Pd multilayers.

31. The disk of claim 19 wherein the underlayer is formed of a material selected from the group consisting of alloys of CoFe, CoNiFe, NiFe, FeCoB, CoCuFe, FeAlSi, FeTaN, FeN, FeTaC, CoTaZr and CoZrNb.

32. The disk of claim 19 wherein the underlayer is a lamination of multiple magnetically permeable films separated by nonmagnetic films.

33. The disk of claim 32 wherein the nonmagnetic films in the lamination provide antiferromagnetic coupling of the magnetically permeable films in the lamination.

* * * * *